(12) United States Patent
El-Zahab

(10) Patent No.: US 12,374,695 B2
(45) Date of Patent: *Jul. 29, 2025

(54) BATTERY COMPRISING A METAL INTERLAYER

(71) Applicant: Bilal M. El-Zahab, Miami Beach, FL (US)

(72) Inventor: Bilal M. El-Zahab, Miami Beach, FL (US)

(73) Assignee: The Florida International University Board of Trustees, Miami, FL (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/930,878

(22) Filed: Sep. 9, 2022

(65) Prior Publication Data

US 2023/0006213 A1 Jan. 5, 2023

Related U.S. Application Data

(63) Continuation of application No. 17/228,243, filed on Apr. 12, 2021, now Pat. No. 11,462,743.

(60) Provisional application No. 63/010,961, filed on Apr. 16, 2020.

(51) Int. Cl.
| | |
|---|---|
| *H01M 4/66* | (2006.01) |
| *H01M 4/134* | (2010.01) |
| *H01M 4/38* | (2006.01) |
| *H01M 4/62* | (2006.01) |
| *H01M 10/0525* | (2010.01) |
| *H01M 50/451* | (2021.01) |
| *H01M 50/457* | (2021.01) |

(52) U.S. Cl.
CPC ............ *H01M 4/661* (2013.01); *H01M 4/134* (2013.01); *H01M 4/382* (2013.01); *H01M 4/628* (2013.01); *H01M 10/0525* (2013.01); *H01M 50/451* (2021.01); *H01M 50/457* (2021.01)

(58) Field of Classification Search
None
See application file for complete search history.

(56) References Cited

U.S. PATENT DOCUMENTS

| | | |
|---|---|---|
| 2011/0008677 A1 | 1/2011 | Nakane et al. |
| 2011/0200863 A1 | 8/2011 | Xiao et al. |
| 2014/0205905 A1 | 7/2014 | Xiao et al. |
| 2014/0329120 A1 | 11/2014 | Cui et al. |
| 2015/0171398 A1* | 6/2015 | Roumi ............ H01M 10/4257 324/426 |
| 2016/0204408 A1 | 7/2016 | Herle |
| 2017/0301902 A1* | 10/2017 | Kim ................ C23C 16/45527 |
| 2021/0218055 A1* | 7/2021 | Visco ................ H01M 50/451 |

* cited by examiner

*Primary Examiner* — Robert S Carrico
(74) *Attorney, Agent, or Firm* — SALIWANCHIK, LLOYD & EISENSCHENK

(57) ABSTRACT

Batteries having a metal interlayer that acts as an ion conductor are provided, as well as methods of forming the same. The metal interlayer can include, for example, palladium, platinum, iridium, rhodium, ruthenium, osmium, gold, silver, or a combination thereof, and can act as a conductor while also inhibiting the transport of other species that would produce byproduct films and cause capacity degradation in the battery.

17 Claims, 5 Drawing Sheets

Metal interlayer between anode and electrolyte

Metal interlayer within the electrolyte

Metal interlayer between cathode and electrolyte

BATTERY COMPRISING A METAL INTERLAYER

CROSS-REFERENCE TO RELATED APPLICATIONS

The present application is a continuation application of U.S. patent application Ser. No. 17/228,243, filed Apr. 12, 2021, which claims the benefit of U.S. Provisional Application Ser. No. 63/010,961, filed Apr. 16, 2020, the disclosures of each of which are hereby incorporated by reference in their entirety, including all figures, tables, or drawings.

BACKGROUND

As the prevalence of portable devices increases, the demand for batteries with high capacity and long life continues to increase as well. Lithium-based batteries are commonly used in portable devices, and there is a need in the art for longer life in such batteries.

BRIEF SUMMARY

Embodiments of the subject invention provide novel and advantageous batteries (e.g., lithium (Li) ion batteries) having a metal interlayer that acts as an ion conductor (e.g., a Li ion conductor), as well as methods of forming the same. The metal interlayer acts as a conductor while also preventing or inhibiting the transport of other species that would otherwise produce byproduct films and cause capacity degradation in the battery (e.g., a Li-based battery). The metal interlayer can prolong the life of the battery by reducing the capacity drop in the battery that would otherwise occur due to the formation of byproduct layers in the surface of the anode (e.g., the lithium anode) in the battery (e.g., in a Li-ion, Li-air, or Li-sulfur (Li-S) battery).

In an embodiment, a battery can comprise: an anode; a cathode; an electrolyte disposed between the anode and the cathode; and a metal interlayer disposed between the anode and cathode and in direct physical contact with the electrolyte. The anode can comprise Li, and the battery can be an Li-based battery (e.g., an Li-ion battery, an Li-air battery, or an Li-sulfur battery). The metal interlayer can comprise at least one of palladium (Pd), platinum (Pt), iridium (Ir), rhodium (Rh), ruthenium (Ru), osmium (Os), gold (Au), and silver (Ag). For example, the metal interlayer can comprise an alloy of two or more of Pd, Pt, Ir, Rh, Ru, Os, Au, and Ag. In a certain embodiment, the metal interlayer can comprise or be an oxide, sulfide, carbide, or fluoride of Pd, Pt, Ir, Rh, Ru, Os, Au, or Ag. The oxide, sulfide, carbide, or fluoride (if present) can be a ternary compound with another metal (e.g., lithium, sodium, potassium, or magnesium). The metal interlayer can be disposed between the electrolyte and the anode, the metal interlayer being in direct physical contact with the anode, and the metal interlayer not being in direct physical contact with the cathode. Alternatively, the metal interlayer can be disposed between the electrolyte and the cathode, the metal interlayer being in direct physical contact with the cathode, and the metal interlayer not being in direct physical contact with the anode. Alternatively, the metal interlayer being disposed between a first electrolyte layer and a second electrolyte layer (the electrolyte can comprise the first electrolyte layer and the second electrolyte layer), the metal interlayer being in direct physical contact with the first electrolyte layer and the second electrolyte layer, the metal interlayer not being in direct physical contact with the anode, and the metal interlayer not being in direct physical contact with the cathode. The metal interlayer can have a thickness in a range of from 0.1 nanometers (nm) to 100 micrometers (μm). The metal interlayer can have a thickness sufficient such that an iconic conductivity (e.g., of Li in an Li-based battery) is at least 0.01 milliSiemens per centimeter (mS/cm) (e.g., at least 1 mS/cm). The metal interlayer can comprise a metal combined (e.g., alloyed) with at least one ionically conductive substance.

In another embodiment, a method of forming a battery (comprising an anode, a cathode, an electrolyte disposed between the anode and the cathode, and a metal interlayer disposed between the anode and the cathode and in direct physical contact with the electrolyte, the metal interlayer comprising a first metal interlayer comprising a first metal can comprise: dissolving a salt of the first metal in a solvent to give a solution; electrochemically depositing the metal interlayer on at least one of the anode, the cathode, and the electrolyte, using the solution and a continuous or pulsed potential; and disposing the cathode and the anode on opposite sides of the electrolyte to give the battery. The electrochemically depositing of the metal interlayer can comprise, for example, sputter coating, atomic layer deposition (ALD), or chemical vapor deposition (CVD) of the metal interlayer. The salt of the first metal can be, for example, a chloride salt of the first metal, a nitrate salt of the first metal, a sulfate salt of the first metal, or an acetate salt of the first metal. The first metal can be Pd, Pt, Ir, Rh, Ru, Os, Au, or Ag, and it is noted that the metal interlayer can comprise additional metals or materials beyond the first metal (e.g., the metal interlayer can comprise an alloy of two or more of Pd, Pt, Ir, Rh, Ru, Os, Au, and Ag, or the metal interlayer can comprise or be an oxide, sulfide, carbide, or fluoride of Pd, Pt, Ir, Rh, Ru, Os, Au, or Ag). The anode can comprise lithium (Li), and the battery can be an Li-based battery (e.g., an Li-ion battery, an Li-air battery, or an Li-sulfur battery). The metal interlayer can be deposited to a thickness sufficient such that an iconic conductivity (e.g., of Li in an Li-based battery) is at least 0.01 mS/cm (e.g., at least 1 mS/cm).

DETAILED DESCRIPTION

Embodiments of the subject invention provide novel and advantageous batteries (e.g., lithium (Li) ion batteries) having a metal interlayer that acts as an ion conductor (e.g., a Li ion conductor), as well as methods of forming the same. The metal interlayer acts as a conductor while also preventing or inhibiting the transport of other species that would otherwise produce byproduct films and cause capacity degradation in the battery (e.g., a Li-based battery). The metal interlayer can prolong the life of the battery by reducing the capacity drop in the battery that would otherwise occur due to the formation of byproduct layers in the surface of the anode (e.g., the lithium anode) in the battery (e.g., in a Li-ion, Li-air, or Li-sulfur (Li-S) battery).

The metal interlayer can comprise, for example, palladium (Pd), platinum (Pt), iridium (Ir), rhodium (Rh), ruthenium (Ru), osmium (Os), gold (Au), silver (Ag), or a combination thereof. In an embodiment, the metal interlayer can comprise an alloy of one or more (e.g., two or more) of Pd, Pt, Ir, Rh, Ru, Os, Au, and Ag. In an embodiment, the metal interlayer can comprise or be an oxide, sulfide, carbide, or fluoride of Pd, Pt, Ir, Rh, Ru, Os, Au, or Ag. The oxide, sulfide, carbide, or fluoride can be a ternary compound with another metal (e.g., lithium, sodium, or magnesium)

Figure 1:
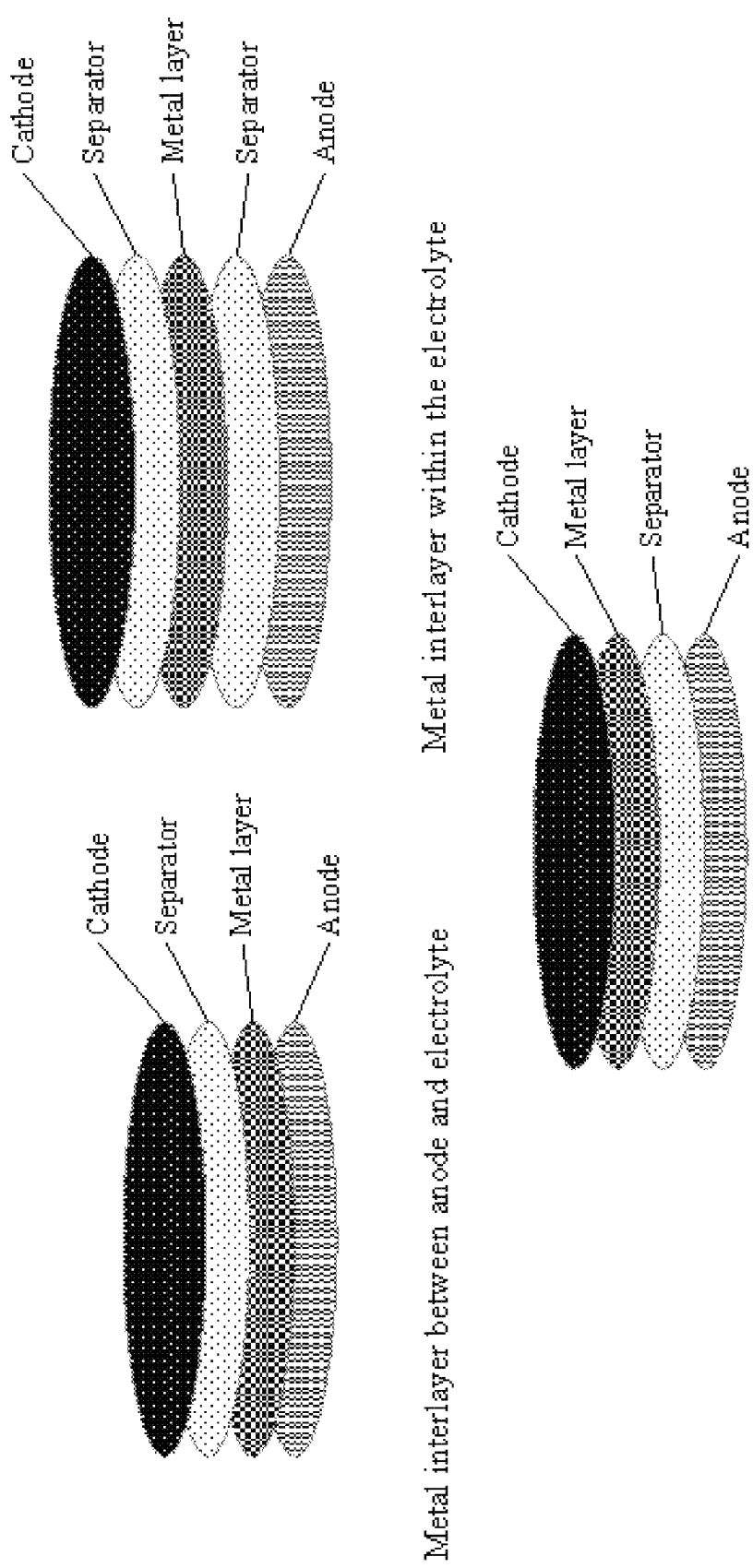
FIG. 1 shows schematic views of: a metal layer between an anode and an electrolyte (top left), according to an embodiment of the subject invention; a metal layer within an electrolyte (top right), according to an embodiment of the subject invention; and a metal layer between a cathode and an electrolyte (bottom middle), according to an embodiment of the subject invention.

FIG. 1 shows schematic views of batteries of embodiments of the subject invention. Referring to the top left section of FIG. 1, in an embodiment, the metal interlayer can be between the anode and the electrolyte (separator). The metal interlayer can be disposed such that it is in direct physical contact with the anode and/or the electrolyte (e.g., an electrolyte separator film). The metal interlayer is not in direct physical contact with the cathode. The metal interlayer can be coated on the electrolyte (e.g., on a side or surface of the electrolyte facing the anode).

Referring to the top right section of FIG. 1, in an embodiment, the metal interlayer can be within the electrolyte (e.g., between separator layers). That is, the metal interlayer can be between two separator films and can be disposed such that it is not in direct physical contact with either the anode or the cathode. The metal interlayer can be in direct physical contact with the electrolyte (e.g., with two electrolyte separator films).

Referring to the bottom middle section of FIG. 1, in an embodiment, the metal interlayer can be between the cathode and the electrolyte (separator). The metal interlayer can be disposed such that it is in direct physical contact with the cathode and/or the electrolyte (e.g., an electrolyte separator film). The metal interlayer is not in direct physical contact with the anode. The metal interlayer can be coated on the electrolyte (e.g., on a side or surface of the electrolyte facing the cathode).

In an embodiment, the metal interlayer can have a thickness of from one atomic layer (e.g., about 0.1 nanometers (nm)) to 100 micrometers (μm) or more. The metal interlayer can have a thickness of, for example, any of the following values, about any of the following values, at least any of the following values, at most any of the following values, less than any of the following values, or more than any of the following values (all numerical values are in nm): 0.1, 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, or 100000. The metal interlayer with an appropriate thickness can allow Li ionic conductivity in a Li-based battery to exceed 0.01 milliSiemen per centimeter (mS/cm) (e.g., at least 1 mS/cm).

In an embodiment, the metal interlayer can be a free-standing film placed manually in the battery. In alternative embodiments, the metal interlayer can be chemically or physically deposited using, for example, sputter coating, atomic layer deposition (ALD), or chemical vapor deposition (CVD).

In an embodiment, the metal interlayer can be electrochemically deposited. For example, the metal interlayer can be electrochemically deposited using one or more soluble salts (e.g., chloride, nitrate, sulfate, acetate, etc.) of the metal(s) of the layer. The metal interlayer can be deposited using continuous or pulsed potentials. An electrochemically deposited film can be prepared on the cathode, electrolyte, or anode before assembly of the battery or after assembly of the battery by adding metal ions as components of the electrolyte.

The metal interlayer can restrict (or inhibit) the transport of certain species (e.g., oxygen, nitrogen, carbon dioxide, sulfides, carbonates, etc.) in the battery while allowing the transport of ions (e.g., Li ions). The metal interlayer can be used in several different types of batteries, including but not necessarily limited to Li-ion batteries, Li-S batteries, Li-air batteries, and other batteries that utilize Li metal as an electrode. The metal interlayer is catalytically active and can prevent or inhibit irreversible byproduct formation by catalyzing the reversible removal of such byproducts. In Li-air batteries, the metal interlayer prevents or inhibits oxygen, nitrogen, and carbon dioxide crossover and their subsequent reactivity with the lithium anode. In Li-S batteries, the metal interlayer prevents or inhibits polysulfide reactivity at the anode by blocking transport of polysulfides either at the cathode (if the metal interlayer is between the cathode and electrolyte), in the electrolyte (if the metal interlayer is within the electrolyte), or at the anode (if the metal interlayer is between the anode and the electrolyte).

In an embodiment, the metal interlayer can be further combined (e.g., alloyed) with one or more ionically conductive substances to yield an even more improved ionic conductivity.

In an embodiment, the metal interlayer can be porous. In an alternative embodiment, the metal interlayer can be non-porous.

Batteries according to embodiments of the subject invention have less capacity drop with each cycle. The metal interlayer is robust and chemically stable and will last for the duration of the life of the battery (e.g., >2000 charge/discharge cycles).

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

A battery was prepared with a Pd metal interlayer electrochemically deposited between the anode and the electrolyte (as seen in the top left section of FIG. 1). The Pd metal interlayer had a thickness of 3 nm. The layer was deposited using 50 millimoles per liter (mmol/L) palladium nitrate salt in dimethylsulfoxide on a lithium metal disc by placing a glass fiber filter with the Pd salt solution between two lithium metals discs. The system was rested for 2 hours and then was pulsed for 5 seconds using a potentiostatic plating with a potential of 0.8 V vs Li/Li+, followed by resting for 55 seconds at 0 V vs Li/Li+. The process was repeated 100 times to deposit about 100 atomic layers of approximately 3 nm in thickness. The negative electrode was recovered (lithium with Pd layer) and used to assemble a Li-S battery.

The Li-S battery was prepared using the previously prepared lithium metal coated with Pd, a Celgard 2400 separator soaked in 1 M LiTFSi, and 0.1 M LiNO$_3$ in a 1:1 (v:v) dioxolane:dimethoxyethane (DOL:DME) solvent. The cathode was 70:20:10 sulfur:carbon nanotubes:polyvinylidene fluoride (PVDF) coated on aluminum foil. As a control, another battery using pristine a lithium metal anode was used. The two batteries were rested for 6 hours prior to testing.

Figure 2:
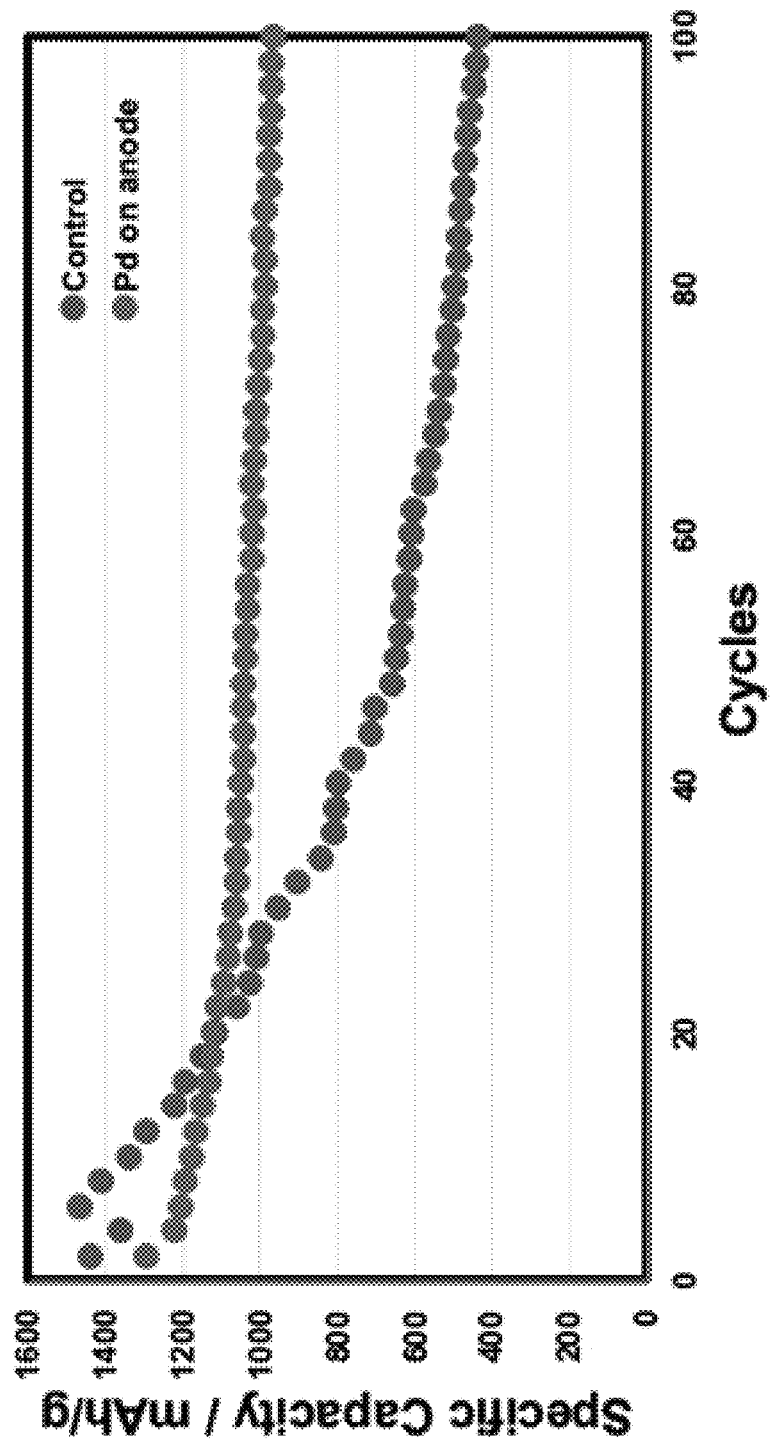
FIG. 2 shows a plot of specific discharge capacity (in mAh/g) of a lithium-sulfur (Li-S) battery over the course of 100 cycles at 836 milliamps per gram (mA/g) (C/2) for a control (the blue) circles that are lower at 40 cycles) and for a battery having a palladium layer between the anode and electrolyte according to an embodiment of the subject invention (the red) circles that are higher at 40 cycles).
Figure 3A:
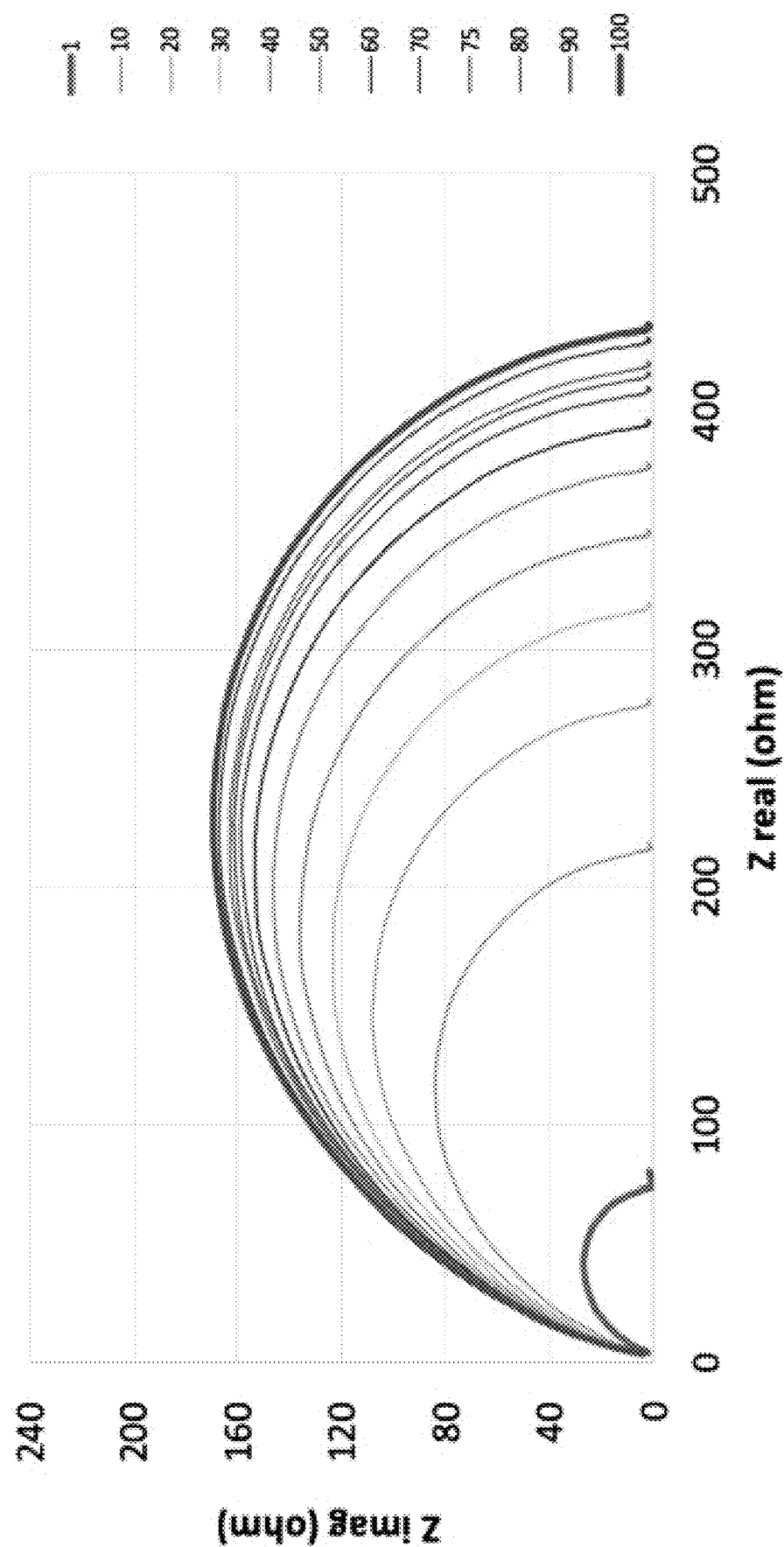
FIG. 3A shows a Nyquist plot of interfacial resistance growth in a control battery. The curve having the lowest Z real value at any given point is for 1; the curve having the second-lowest Z real value at any given point is for 10; the curve having the third-lowest Z real value at any given point is for 20; the curve having the fourth-lowest Z real value at any given point is for 30; the curve having the fifth-lowest Z real value at any given point is for 40; the curve having the sixth-lowest Z real value at any given point is for 50; the curve having the seventh-lowest Z real value at any given point is for 60; the curve having the eighth-lowest Z real value at any given point is for 70; the curve having the ninth-lowest Z real value at any given point is for 75; the curve having the third-highest Z real value at any given point is for 80; the curve having the second-highest Z real value at any given point is for 90; the curve having the highest Z real value at any given point is for 100.
Figure 3B:
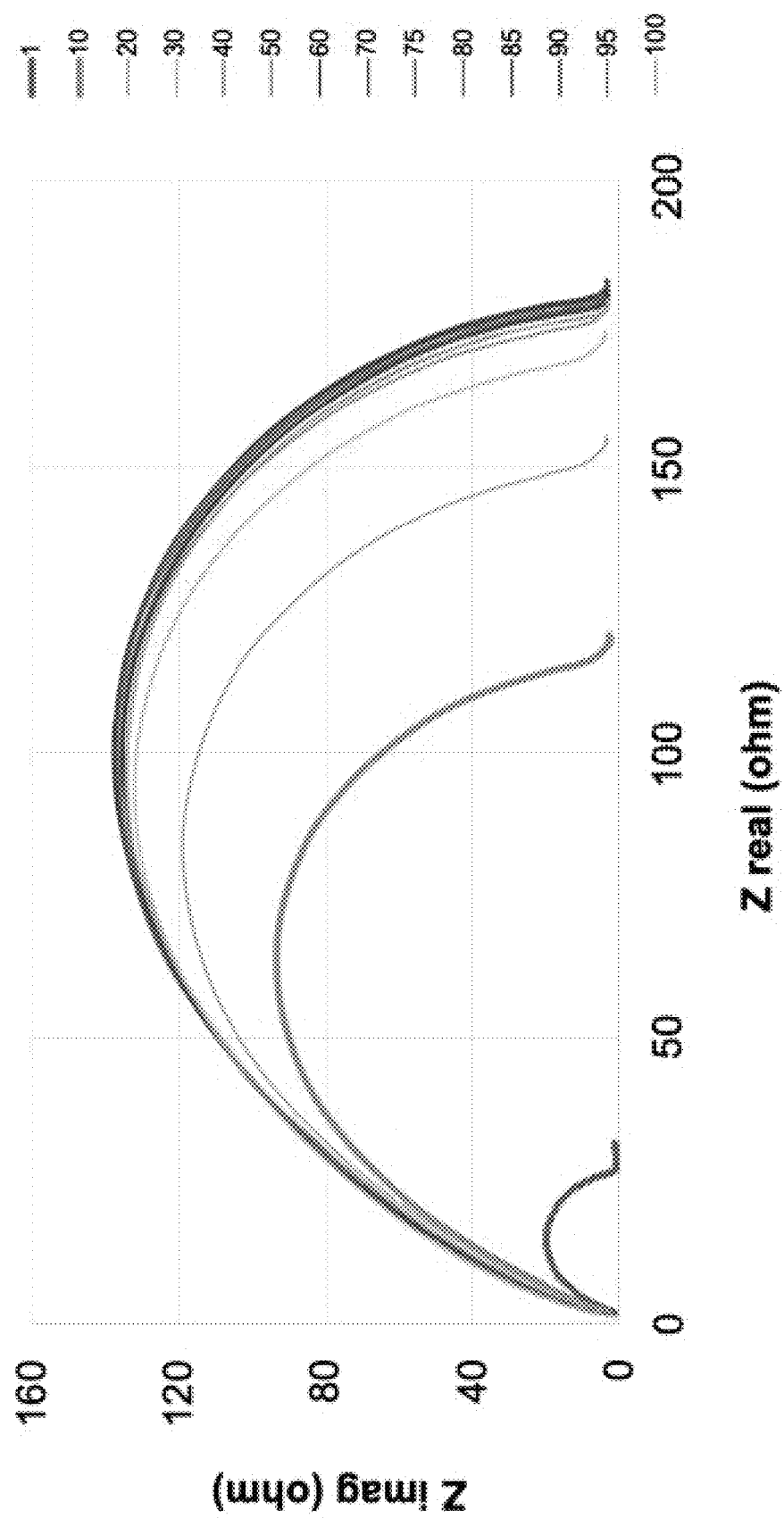
FIG. 3B shows a Nyquist plot of interfacial resistance growth in a battery having a palladium layer between the anode and electrolyte according to an embodiment of the subject invention. The curve having the lowest Z real value at any given point is for 1; the curve having the second-lowest Z real value at any given point is for 10; the curve having the third-lowest Z real value at any given point is for 20; the curve having the fourth-lowest Z real value at any given point is for 30; the curve having the fifth-lowest Z real value at any given point is for 40; the curve having the sixth-lowest Z real value at any given point is for 50; the curve having the seventh-lowest Z real value at any given point is for 60; the curve having the eighth-lowest Z real value at any given point is for 70; the curve having the ninth-lowest Z real value at any given point is for 75; the curve having the third-highest Z real value at any given point is for 80; the curve having the second-highest Z real value at any given point is for 90; the curve having the highest Z real value at any given point is for 100.

To test the batteries, galvanostatic charge and discharge at C/2 was used (current of 836 mA/g-sulfur). The batteries were rested for 5 minutes after each charge and discharge step. The capacity evolution of the batteries was tracked and is shown in FIG. 2. The reduced drop of the specific capacity for the Pd on anode battery confirms the participation of the metal interlayer in reducing the passivation of the anode by preventing or inhibiting polysulfide species crossover. This was further demonstrated by tracking the resistance growth and showing lower interfacial resistance growth for the batteries containing the Pd layer, as shown in FIGS. 3A (control) and 3B (battery having the Pd interlayer).

Example 2

Figure 4:
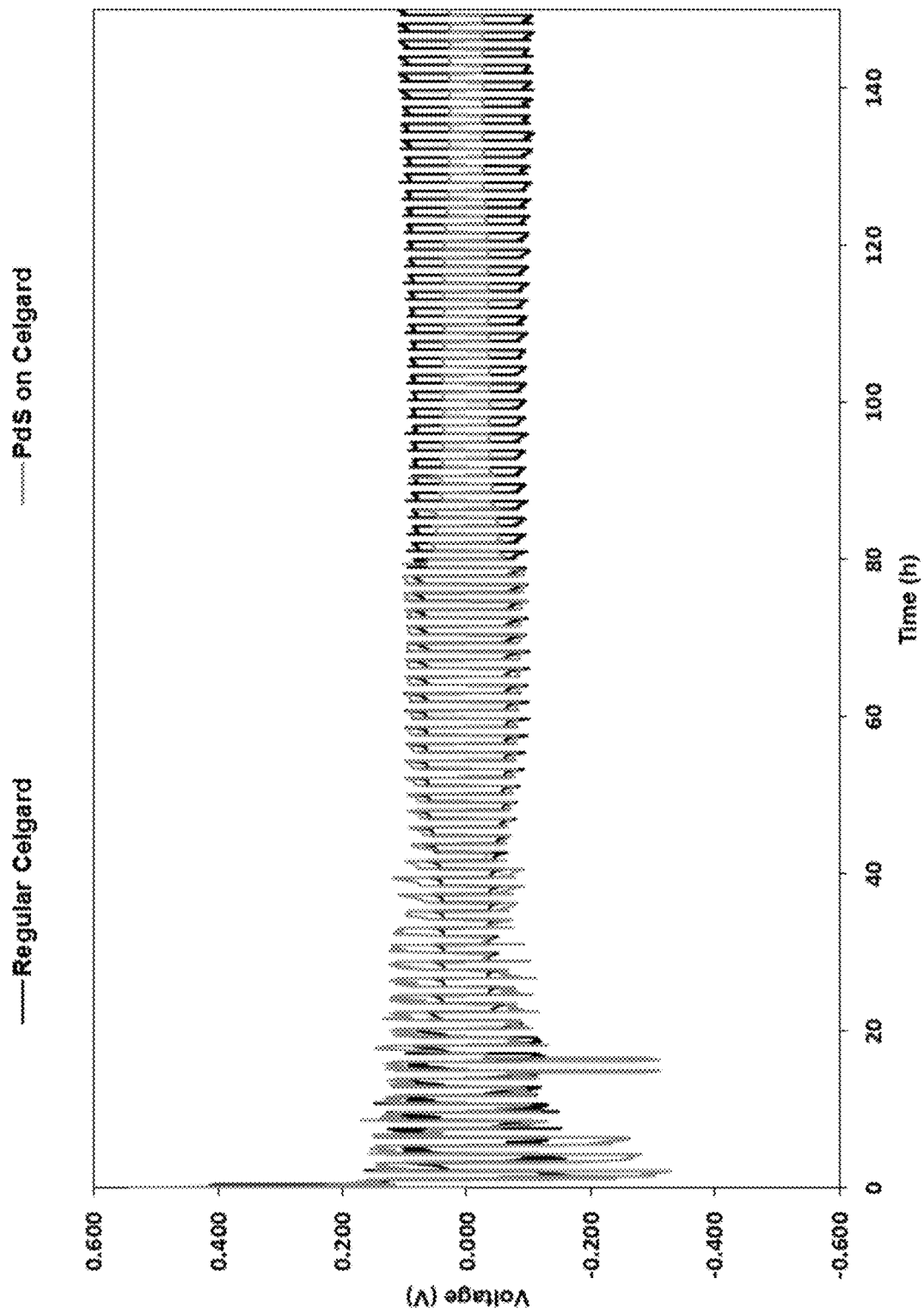
FIG. 4 shows a plot of voltage (in Volts (V)) versus time (in hours (h)) for a PdS-coated separator and a control. The (green) curve that is much more clustered around 0.000 V from 100-150 h is for the PdS-coated separator. The (black) curve that has much higher absolute value voltage values from 100-150 h is for the control.

A battery was prepared with a PdS metal interlayer between the anode and the electrolyte (as seen in the top left section of FIG. 1). Using palladium sulfide powders, a plasma target was prepared and palladium sulfide (PdS) was sputter-coated on a 0.5-inch thick polypropylene separator (Celgard 2400) disc to produce a 1-micrometer thick layer. The coated separator was then used to prepare a lithium:lithium symmetric cell to plate and strip lithium using a galvanostatic process. The resulting voltage versus time plot is shown in FIG. 4, illustrating that the PdS-coated separator facing the anode side had better voltage stability at a current of 1 milliamp per square centimeter (mA/cm$^2$) as the voltage stabilized around ±6 millivolts (mV). The control using a pristine Celgard separator had voltage increasing to ±15 mV. This indicates more efficient and reproducible lithium plating process with the battery having the PdS metal interlayer.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A battery, comprising:
   an anode;
   a cathode;
   an electrolyte disposed between the anode and the cathode; and
   a metal interlayer disposed between the anode and cathode and in direct physical contact with the electrolyte, the metal interlayer being a sulfide of platinum (Pt).

2. The battery according to claim 1, the anode comprising lithium (Li), and the battery being an Li-based battery.

3. The battery according to claim 1, the metal interlayer being porous.

4. The battery according to claim 1, the sulfide being a ternary compound with lithium, sodium, potassium, or magnesium.

5. The battery according to claim 1, the metal interlayer being disposed between the electrolyte and the anode,
   the metal interlayer being in direct physical contact with the anode, and
   the metal interlayer not being in direct physical contact with the cathode.

6. The battery according to claim 1, the metal interlayer being disposed between the electrolyte and the cathode,
   the metal interlayer being in direct physical contact with the cathode, and
   the metal interlayer not being in direct physical contact with the anode.

7. The battery according to claim 1, the electrolyte comprising a first electrolyte layer and a second electrolyte layer,
   the metal interlayer being disposed between the first electrolyte layer and the second electrolyte layer,
   the metal interlayer being in direct physical contact with the first electrolyte layer and the second electrolyte layer,
   the metal interlayer not being in direct physical contact with the anode, and
   the metal interlayer not being in direct physical contact with the cathode.

8. The battery according to claim 1, the metal interlayer having a thickness in a range of from 0.1 nanometers (nm) to 100 micrometers (μm).

9. The battery according to claim 1, the anode comprising lithium (Li), and the battery being an Li-based battery, and the metal interlayer having a thickness sufficient such that an iconic conductivity of Li in the Li-based battery is at least 0.01 milliSiemens per centimeter (mS/cm).

10. The battery according to claim 1, the metal interlayer comprising a metal combined with at least one ionically conductive substance.

11. A method of forming a battery, the battery comprising:
an anode;
a cathode;
an electrolyte disposed between the anode and the cathode; and
a metal interlayer disposed between the anode and cathode and in direct physical contact with the electrolyte, the metal interlayer comprising a first metal, and
the method comprising:
dissolving a salt of the first metal in a solvent to give a solution;
electrochemically depositing the metal interlayer on at least one of the anode, the cathode, and the electrolyte, using the solution and a continuous or pulsed potential; and
disposing the cathode and the anode on opposite sides of the electrolyte to give the battery,
the first metal being platinum (Pt), and
the metal interlayer being a sulfide of platinum (Pt).

12. The method according to claim 11, the electrochemically depositing of the metal interlayer comprising sputter coating, atomic layer deposition (ALD), or chemical vapor deposition (CVD) of the metal interlayer.

13. The method according to claim 11, the salt of the first metal being a chloride salt of the first metal, a nitrate salt of the first metal, a sulfate salt of the first metal, or an acetate salt of the first metal.

14. The method according to claim 11, the anode comprising lithium (Li), and the battery being an Li-based battery, and the metal interlayer being deposited to a thickness sufficient such that an iconic conductivity of Li in the Li-based battery is at least 0.01 milliSiemens per centimeter (mS/cm).

15. The method according to claim 11, the sulfide being a ternary compound with lithium, sodium, potassium, or magnesium.

16. A method of forming a battery, the battery comprising:
an anode;
a cathode;
an electrolyte disposed between the anode and the cathode; and
a metal interlayer disposed between the anode and cathode and in direct physical contact with the electrolyte, the metal interlayer comprising a first metal, and
the method comprising:
dissolving a salt of the first metal in a solvent to give a solution;
electrochemically depositing the metal interlayer on at least one of the anode, the cathode, and the electrolyte, using the solution and a continuous or pulsed potential; and
disposing the cathode and the anode on opposite sides of the electrolyte to give the battery,
the electrochemically depositing of the metal interlayer comprising sputter coating, atomic layer deposition (ALD), or chemical vapor deposition (CVD) of the metal interlayer,
the salt of the first metal being a chloride salt of the first metal, a nitrate salt of the first metal, a sulfate salt of the first metal, or an acetate salt of the first metal,
the first metal being platinum (Pt),
the anode comprising lithium (Li), and the battery being an Li-based battery,
the metal interlayer being deposited to a thickness sufficient such that an iconic conductivity of Li in the Li-based battery is at least 0.01 milliSiemens per centimeter (mS/cm), and
the metal interlayer being a sulfide of platinum (Pt).

17. The method according to claim 16, the sulfide being a ternary compound with lithium, sodium, potassium, or magnesium.

\* \* \* \* \*